H. L. PIPER.
CURTAIN WINDOW.
APPLICATION FILED SEPT. 9, 1921.

1,437,011.

Patented Nov. 28, 1922.

Hiram Lucas Piper
INVENTOR
BY ATTORNEY

Patented Nov. 28, 1922.

1,437,011

UNITED STATES PATENT OFFICE.

HIRAM LUCAS PIPER, OF MONTREAL, QUEBEC, CANADA.

CURTAIN WINDOW.

Application filed September 9, 1921. Serial No. 499,527.

*To all whom it may concern:*

Be it known that I, HIRAM LUCAS PIPER, a subject of the King of Great Britain, and resident of the city of Montreal, Province of Quebec, Canada, have invented certain new and useful Improvements in Curtain Windows, and do hereby declare that the following is a full, clear, and exact description of same.

This invention relates to windows for automobile tops or other flexible curtain arrangements provided with sight openings covered by glass or equivalent transparent sheets, an object of the invention being to provide a neat, readily applied frame for securing the transparent sheet in position and featuring separate co-operating rigid frame pieces positively secured together by readily removable fastenings obscured from exterior view to ensure neatness.

A further object is the provision of a novel frame construction for tightly clamping the transparent sheet to avoid rattling thereof and likelihood of its breaking and to ensure water-tight closure excluding rain and moisture from the interior of the vehicle or other enclosure protected by the curtain arrangement.

The above objects with the features and advantages of the invention will be hereinafter more fully described and particularly pointed out in the appended claims.

For full comprehension, however, of my invention reference should be had to the accompanying drawings forming a part of this specification in which the same reference characters indicate like parts and wherein.

Figure 1:
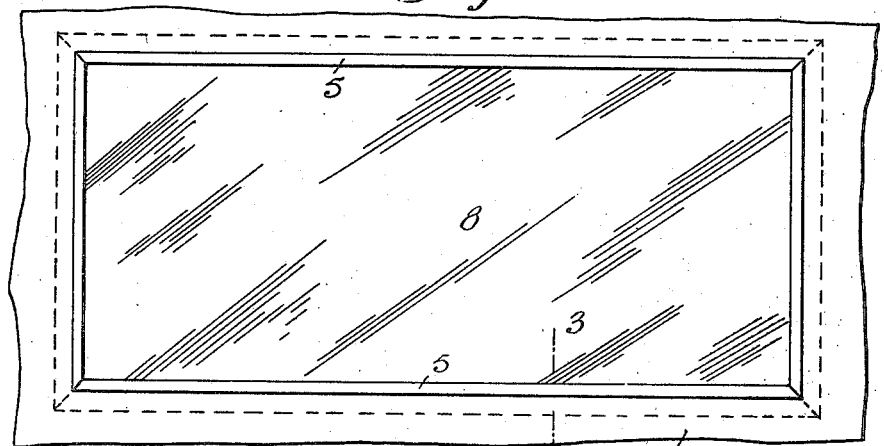
Fig. 1 is an exterior face view of my improved curtain window construction.
Figure 2:
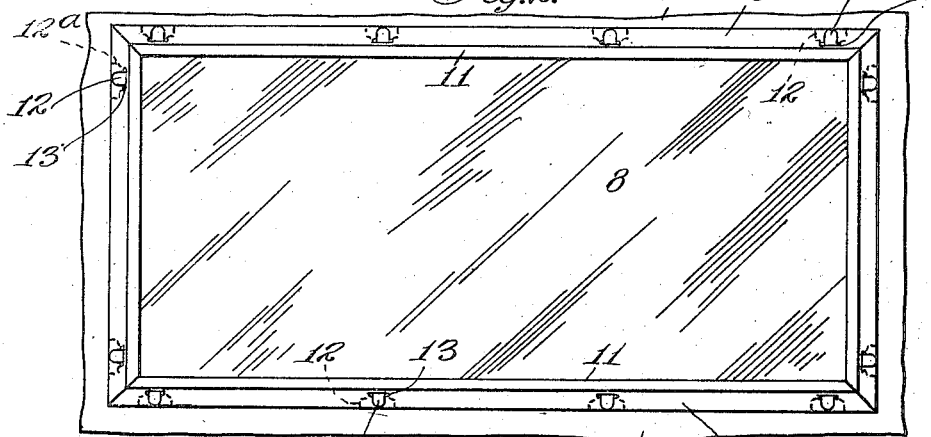
Fig. 2 is a similar view from the interior.

Referring now to the drawings, 2 indicates a portion of an automobile top composed of the usual fabric or flexible material and having the opening 3 therein, the shape of which latter is varied according to requirements and, in the present instance is of rectangular form.

According to my invention the edges of the opening are bound by a rigid metallic frame piece comprising a flat interior margin 4 extending inwardly from the edges of the opening and an exterior margin 5 rolled over to embrace the edges of the fabric. It is intended that this frame serve as a permanent binding, the edges of the fabric being folded inwardly at 6 over a cord or wire 7 extending around the opening to serve as a binding strip and also constitute a bead over which the margins 5 are rolled to positively engage the edges of the opening. The rolled over margin is of just sufficient extent to engage outwardly over the bead and as will be apparent from the following description, constitute the only exteriorly visible portion of the frame.

The glass 8 or other transparent sheet is secured against the interior margin 4 of the frame by interior rigid frame pieces or securing strips of Z-form in cross-section, each of such strips extending at 9 from the interior edge of margin 4 towards the opening, then inwardly to form a shoulder 10 or abutment for the edge of the glass, and continuing inwardly at 11 to constitute a flat embracing margin co-operating with the margin 4 to hold the glass. In the preferred form the margin 11 of each securing strip is outwardly inclined with respect to the opening 3 and glass sheet 8, forming an acute angle with the shoulder 10 and by its angular position ensuring a positively snug abutment against the glass. The flat condition of this margin 11 enables it to give slightly owing to the material resiliency of the metal and thereby provides a clamping action upon the glass when the frame pieces are secured together as will now be described. These securing strips are fastened to the margin 4 by flat clips which comprise bases 12 and tongues 12ª, the latter being adapted to be slipped inwardly through registering slots 13 in the margin 4 and flanges 9, the bases being bent flat upon the exterior surface of flange 4 and the tongues upon the interior surface of flange 9. The clips are preferably composed of pliable sheet metal which when bent into U-form as above described, positively held the co-operating portions of the frame together.

The slots 13 are located at suitable intervals at points just outside the shoulder 10 of the securing strips, thus locating these fastening devices between the edges of the co-operating frame pieces to ensure a firm clamping connection preventing undue tendency of the pieces to gape at their edges as would be noticed were the fastenings localized near either edge.

In order to further improve the tight connection between the frame pieces I support a packing strip 15 upon the shoulder 10 between the glass and the margin 4, such packing strip being of a soft compressible material so that the glass can be tightly clamped between the frame pieces thus preventing rattling of the glass and combined with the light construction of the frame making it possible to use thinner and less expensive glass than could be safely utilized if the glass was only loosely held in place. This packing strip securely seals the joint between the margin 4 and flange 9 thus excluding moisture and to enhance this function I prefer to utilize a packing strip impregnated with an adhesive substance to improve its waterproof quality and its adherence to adjacent surfaces, a suitable material for the purpose being insulating or electric tape folded over upon itself to form a multiple ply packing. This packing strip is, as just described, supported upon the shoulder 10 thus maintaining the strip coextensive with or within the area bounded by the edges of the glass to avoid the sharp corners of the latter being embedded in the strip and destroying it by cutting.

The exterior ends or bases 12 of the clips overlap the exterior surface of the margin 4 but are obscured from view by the curtain 2 which extends from the margin 5 loosely over the margin 4 thus covering the fastenings although permitting ready access thereto for removal to remove or renew the glass, the free relation between the curtain and the margin 4 permitting the insertion of a person's fingers therebetween to remove a clip subsequent to the straightening of the tongue thereof from the interior.

Figure 3:
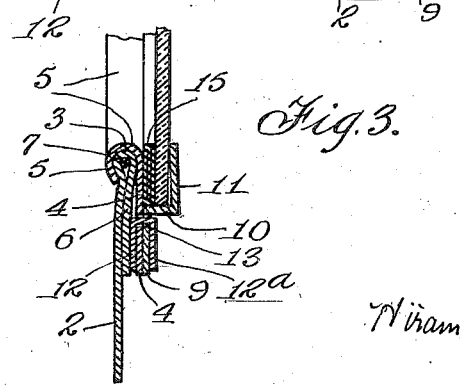
Fig. 3 is an enlarged detail transverse section on line 3—3 Fig. 1.

Fig. 3 illustrates the curtain 2 including turned portion 6, as extending down closely over margin 4 and clip 12 but it will be clear that the curtain is only fastened to the frame at a point within the confines of the roll 5 so that while the comparatively soft character of the curtain material will usually cause it to rest against the margin 4 and clip as shown, said soft character of the curtain, accentuated by the wide unsupported span of the curtain, will enable it to be bulged out slightly by a person removing the clips as above described.

From Fig. 3 it will be clearly seen that the co-operating frame pieces are constructed to provide a substantial flat abutment for each other on both the inside and outside of the clips with respect to the opening, thus firmly combining the frame pieces and minimizing likelihood of relative movement, this firm readily disconnected frame construction being secured without sacrifice to appearances as the neat narrow frame margin 5 is the only exteriorly visible portion.

What I claim is as follows:

1. In a frame for a curtain window, the combination with a curtain having an opening, the edges of the opening being turned inwardly, of a bordering frame, one margin of which is rolled outwardly over the turned edge of the opening and the other margin extended outwardly from the opening interiorly of the curtain and formed with slots; a glass sheet covering the opening; a securing frame of Z-form in cross-section with a portion lying flat against the inwardly extending margin of the bordering frame and formed with slots registering with the slots of said inwardly extending margin, such securing frame extending at an angle to form a shoulder, against which the edges of the glass sheet abut, and also extending inwardly over the interior surface of the glass sheet adjacent the edge thereof, and clips of pliable material, free of the curtain, inserted through said registering slots and bent into U-form over the exterior surface of the bordering frame and interior surface of the securing frame.

2. In a frame for a curtain window, the combination with a curtain having an opening, the edges of the opening being turned inwardly, of a bordering frame, one margin of which is rolled outwardly over the turned edge of the opening and the other margin extended outwardly from the opening interiorly of the curtain and formed with slots; a glass sheet covering the opening; a securing frame of Z-form in cross-section with a portion lying flat against the inwardly extending margin of the bordering frame and formed with slots registering with the slots of said inwardly extending margin, such securing frame extending at an angle to form a shoulder, against which the edges of the glass sheet abut, and also extending inwardly over the interior surface of the glass sheet and adjacent the edge thereof; a compressible packing strip supported by said shoulder between the exterior surface of the glass sheet and the bordering frame, and clips of pliable material, free of the curtain, inserted through said registering slots and bent into U-form over the exterior surface of the binding frame and interior surface of the securing frame.

3. In a frame for a curtain window, the combination with a curtain having an opening, the edges of the opening being turned inwardly, of a binding strip enclosed by the turned edges; a bordering frame, one margin of which is rolled outwardly over the turned edge of the opening and the other margin extended outwardly from the opening interiorly of the curtain and formed with slots; a glass sheet covering the opening; a securing frame of Z-form in cross-section with a portion lying flat against the inwardly extending margin of the bordering frame and formed with slots registering with the slots of said inwardly extending margin, such securing frame extending at an angle to form a shoulder, against which the edges of the glass sheet abut, and also extending inwardly over the interior surface of the glass sheet adjacent the edge thereof; a compressible and adhesive packing strip supported by said shoulder between the exterior surface of the glass sheet and the bordering frame, and clips of pliable material, free of the curtain, inserted through said registering slots and bent into U-form over the exterior surface of the binding frame and interior surface of the securing frame.

In testimony whereof, I have signed my name to this specification, in the presence of two subscribing witnesses.

HIRAM LUCAS PIPER.

Witnesses:
 FRED J. SEARS,
 AUGUSTUS R. EVANS.